US010671882B2

(12) United States Patent
Nasukawa et al.

(10) Patent No.: US 10,671,882 B2
(45) Date of Patent: Jun. 2, 2020

(54) METHOD FOR IDENTIFYING CONCEPTS THAT CAUSE SIGNIFICANT DEVIATIONS OF REGIONAL DISTRIBUTION IN A LARGE DATA SET

(71) Applicant: INTERNATIONAL BUSINESS MACHINES CORPORATION, Armonk, NY (US)

(72) Inventors: Tetsuya Nasukawa, Kanagawa-ken (JP); Kazuki Sato, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/812,464

(22) Filed: Nov. 14, 2017

(65) Prior Publication Data
US 2019/0147291 A1 May 16, 2019

(51) Int. Cl.
*G06K 9/62* (2006.01)
*G06F 17/27* (2006.01)
*G06T 11/60* (2006.01)
*G06F 16/583* (2019.01)

(52) U.S. Cl.
CPC ....... *G06K 9/6215* (2013.01); *G06F 17/2735* (2013.01); *G06F 17/2765* (2013.01); *G06T 11/60* (2013.01); *G06F 16/583* (2019.01)

(58) Field of Classification Search
CPC .............. G06K 9/6215; G06F 17/2735; G06F 17/2765; G06T 11/60
See application file for complete search history.

(56) References Cited

U.S. PATENT DOCUMENTS

| | | | | |
|---|---|---|---|---|
| 8,005,831 | B2* | 8/2011 | Hull | G06F 16/29 707/731 |
| 8,098,934 | B2* | 1/2012 | Vincent | G06K 9/3258 382/177 |
| 8,554,020 | B2* | 10/2013 | Berger | G06T 11/60 382/305 |
| 9,336,302 | B1* | 5/2016 | Swamy | G06F 16/2465 |
| 9,396,253 | B2 | 7/2016 | Porpora et al. | |
| 9,672,497 | B1* | 6/2017 | Lewis | G06F 17/277 |
| 10,255,294 | B2* | 4/2019 | Gu | G06F 16/90328 |
| 2005/0140676 | A1* | 6/2005 | Cho | G01C 21/3635 345/440 |
| 2006/0251339 | A1* | 11/2006 | Gokturk | G06K 9/00375 382/305 |
| 2006/0253491 | A1* | 11/2006 | Gokturk | G06F 16/5838 |

(Continued)

OTHER PUBLICATIONS

Jones, C.B. et al., "Spatial Information Retrieval and Geographical Ontologies an Overview of the SPIRIT Project" SIGIR'02 (Aug. 2002) pp. 387-388.

(Continued)

*Primary Examiner* — Mekonen T Bekele
(74) *Attorney, Agent, or Firm* — Tutunjian & Bitetto, P.C.; Vazken Alexanian

(57) ABSTRACT

A technique for use in analyzing multidimensional data is disclosed. In the technique, a subset of texts specified by a textual feature is selected from the multidimensional data. Each text of the subset is projected into a target image based on the corresponding spatial information to obtain a spatial distribution map for the textual feature. The similarity between the spatial distribution map for the textual feature and each property distribution map for each predefined property is determined. For the similarity exceeding a threshold, the textual feature is outputted as a notable textual feature.

20 Claims, 12 Drawing Sheets

(56) References Cited

U.S. PATENT DOCUMENTS

| | | | | |
|---|---|---|---|---|
| 2008/0010605 A1* | 1/2008 | Frank | ................. | G06F 16/38 |
| | | | | 715/765 |
| 2012/0039546 A1* | 2/2012 | Berger | ................. | G06T 11/60 |
| | | | | 382/305 |
| 2014/0046983 A1 | 2/2014 | Galloway et al. | | |
| 2016/0203217 A1 | 7/2016 | Anisingaraju et al. | | |
| 2018/0165554 A1* | 6/2018 | Zhang | ................. | G06K 9/6269 |

OTHER PUBLICATIONS

Lee, R. et al., "Measuring Geographical Regularities of Crowd Behaviors for Twitter-based Geo-social Event Detection" ACM LSBN'10 (Nov. 2010) pp. 1-10.

Medical Subject Headings, accessed on Oct. 20, 2017, https://www.nlm.nih.gov/mesh, pp. 1-2.

Shinyana, Y. et al., "Kairai—software robots understanding natural language" Technical report, Department of Computer Science Tokyo Institute of Technology (Jul. 2000) pp. 1-7.

StatPlanet Cloud, accessed on Oct. 20, 2017, https://statsilk.com/world/stats/, pp. 1.

Wise, J.A. et al., "Visualizing the non-visual: spatial analysis and interaction with information from text documents" IEEE (Oct. 1995) pp. 51-58.

WordNet, A lexical database for English, accessed on Oct. 20, 2017, https://wordnet.princeton.edu/, pp. 1-3.

Population Density, World by Map, accessed on Oct. 20, 2017, last updated Feb. 2, 2017, https://world.bymap.org/, pp. 1-4.

\* cited by examiner

```
{"type":"FeatureCollection","features":[

{"type":"Feature","id":"01","properties":{"name":"head"},"geometry":{"type":"Polygon","coordinates":
[[[13,117],[38,117],[38,92],[13,92],[13,117]]]}}, {"type":"Feature","id":"02","properties":{"name":"body"},"geometry":{"type":"Polygon","coordinates":
[[[13,91],[38,91],[38,41],[13,41],[13,91]]]}}, {"type":"Feature","id":"03","properties":{"name":"right
arm"},"geometry":{"type":"Polygon","coordinates":[[[0,91],[12,91],[12,51],[0,51],[0,91]]]}}, {"type":"Feature","id":"04","properties":{"name":"left
arm"},"geometry":{"type":"Polygon","coordinates":[[[39,91],[51,91],[51,51],[39,51],[51,91]]]}},
```

*FIG. 3*

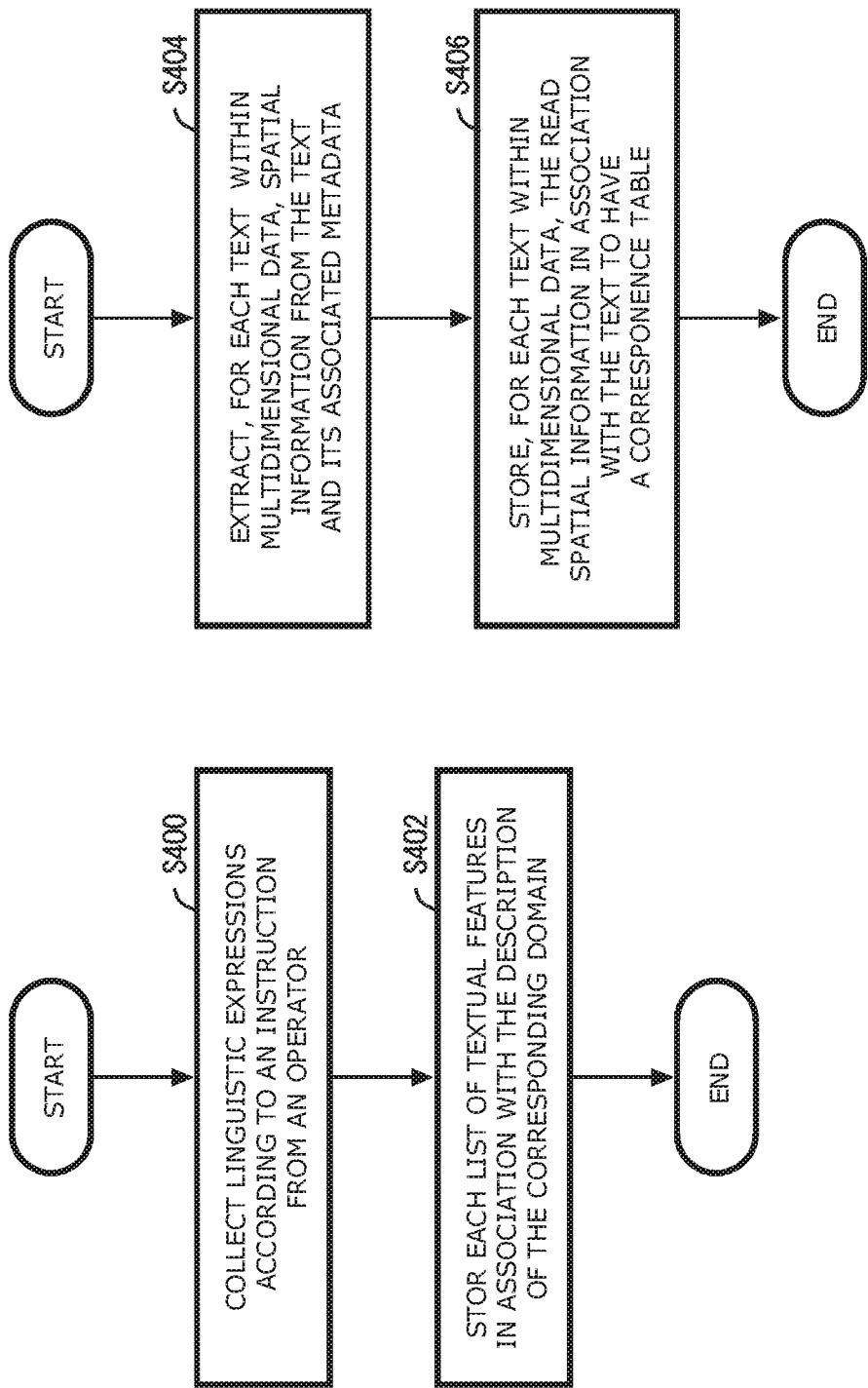

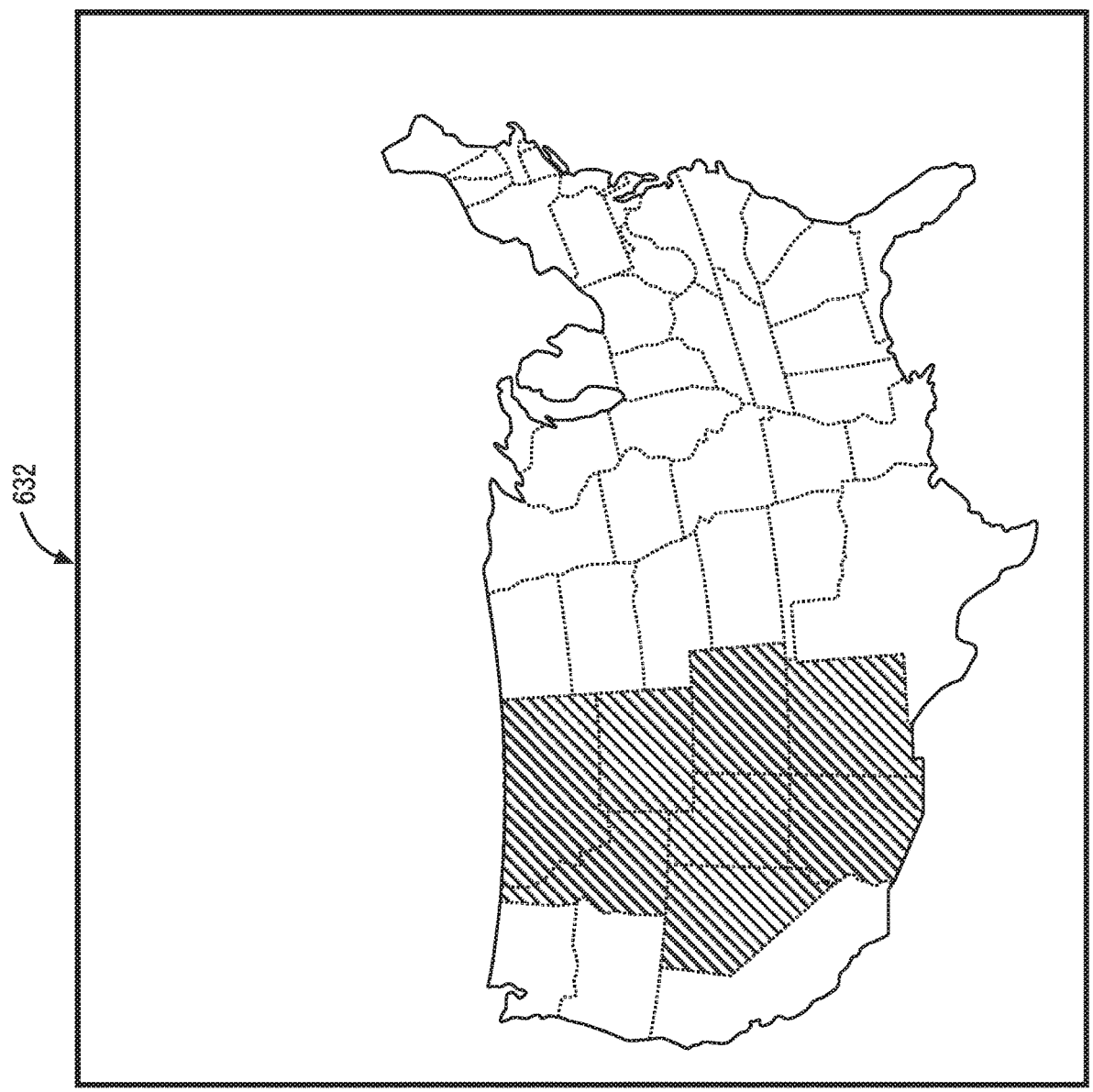

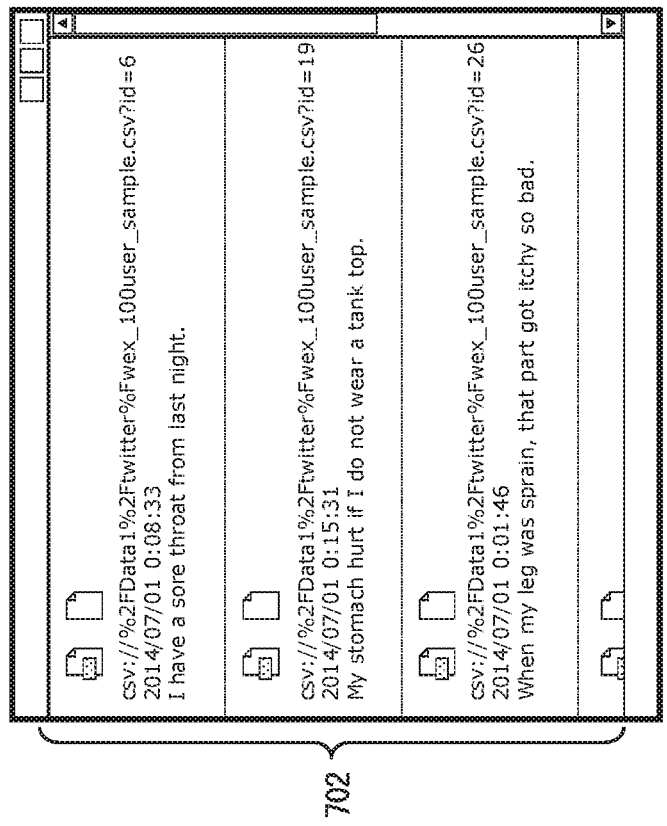
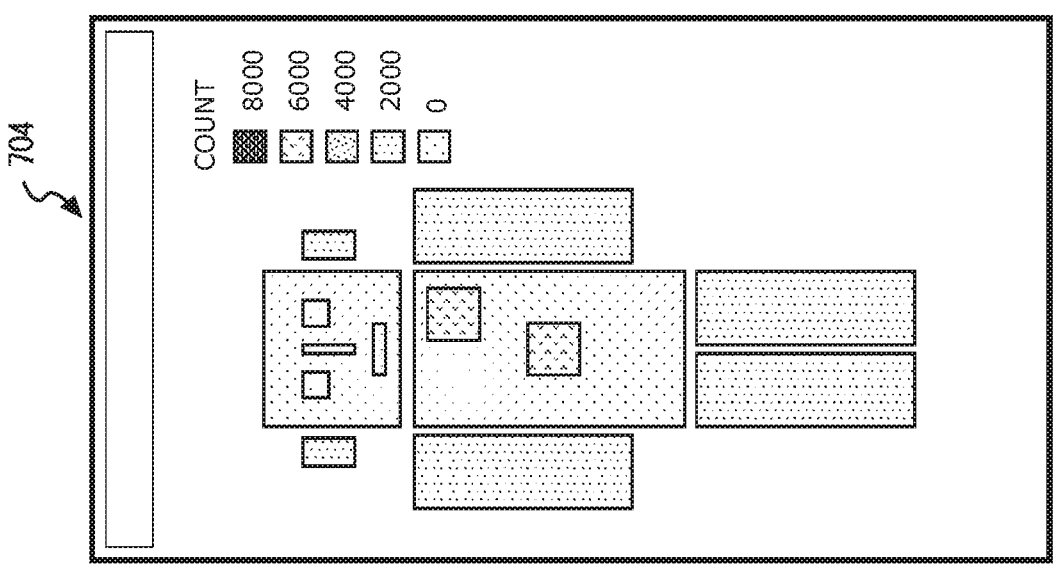
FIG. 7

METHOD FOR IDENTIFYING CONCEPTS THAT CAUSE SIGNIFICANT DEVIATIONS OF REGIONAL DISTRIBUTION IN A LARGE DATA SET

BACKGROUND

Technical Field

The present disclosure relates to data analysis, and more specifically, to data analysis using spatial information.

Related Art

Techniques for deriving insights from a large amount of unstructured text data are essential for utilizing Big Data analytics.

In order to improve such techniques for acquiring deeper insights, one approach is to enrich information obtainable from text data by structuring the data as much as possible.

Textual data often contain spatial information such as geographical information (e.g., city).

Some attempts have been made to conduct data analysis with spatial information. However, such attempts are limited to simple concepts such as map visualization of spatial information and identification of a word which appears frequently in content of a social network and for which corresponding spatial information is concentrated in a single area on a map.

SUMMARY

According to an embodiment of the present invention, there is provided a computer-implemented method for use in analyzing multidimensional data. The method comprises selecting a subset of texts which is specified by a textual feature from the multidimensional data and extracting, for each text, corresponding spatial information from the multidimensional data. The method further comprises projecting each text of the subset into a target image based on the corresponding spatial information to obtain a spatial distribution map for the textual feature. In addition, the method comprises obtaining, for a predefined property, a property distribution map which shows portions having the predefined property on the target image. The method comprises determining the similarity between the spatial distribution map for the textual feature and the property distribution map for the predefined property and outputting, in response to the similarity exceeding a threshold, the textual feature as a notable textual feature together with the predefined property.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 show a part of a definition file, according to an embodiment of the present invention;

FIGS. 4A and 4B are flowcharts depicting a preprocessing before analysis, according to an embodiment of the present invention;

FIGS. 6B and 6D show distributions for selected predefined properties;

FIG. 7 shows experimental results of projection to a human body, according to an embodiment of the present invention;

DETAILED DESCRIPTION

Figure 1:
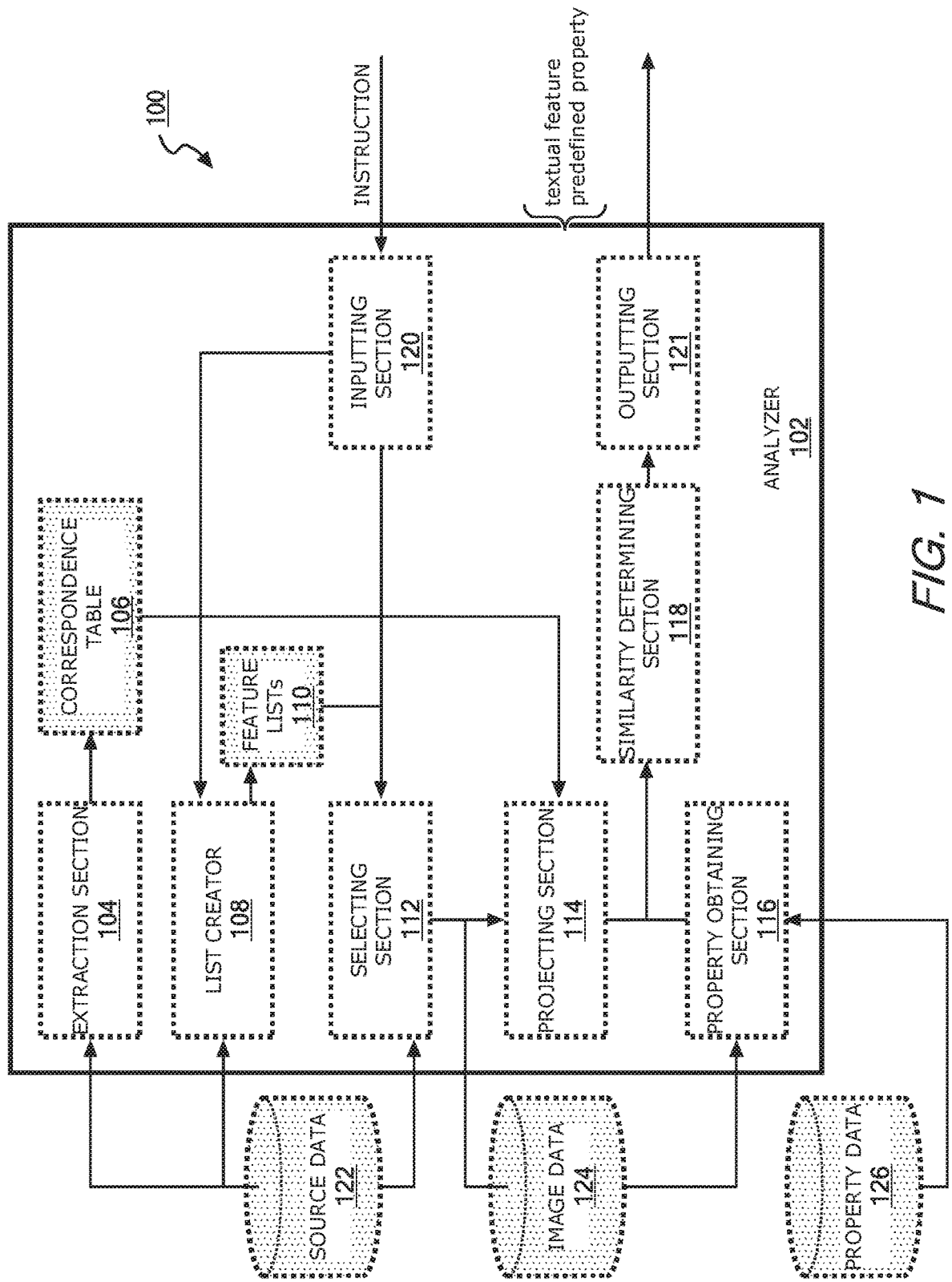
FIG. 1 illustrates a block diagram of a system according to an exemplary embodiment of the present invention.

Before explaining at least one embodiment of the present invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, computer-implemented method or computer program product.

Hereinafter, referring to the series of FIGS. 1, 2A, 2B, 3, 4A, 4B, 5A, and 5B, a computer system and a computer-implemented method for use in analyzing multidimensional data according to an exemplary embodiment of the present invention are described. Then, referring to FIGS. 6A-6E and 7, experimental results according to embodiments of the present invention are described. Finally, referring to FIG. 8, a hardware configuration of a computer system according to one or more embodiments of the present invention is described.

FIG. 1 shows a system 100 into which one embodiment of the present invention is implemented. The system 100 may derive insights from spatial features in association with an expression contained in textual data within multidimensional data. More specifically, the system 100 acquires a spatial distribution for a textual feature such as a keyword by collecting a set of textual data containing the textual feature and by using a set of spatial information which is linked to or described in the set of textual data. Then, the system 100 identifies a textual feature that causes a specific distribution in spatial information by comparing the spatial distribution for the textual feature to various types of property distributions such as a rainy area, a river side area and an area with many tall buildings. Finally, the system 100 outputs the textual feature as notable textual feature.

The system 100 may include an analyzer 102, a storage unit of source data 122, a storage unit of image data 124 and a storage unit of property data 126. The analyzer 102 may include an extracting section 104, a list creator 108, a selecting section 112, a projecting section 114, a property obtaining section 116, a similarity determining section 118, an inputting section 120 and an outputting section 121.

The storage unit of source data 122 stores multidimensional data in one or more storage media or devices. The multidimensional data analyzed by the analyzer 102 may be a collection of textual data that can be associated with various types of metadata. Each unit of the textual data analyzed by the analyzer 102 may have spatial information described either in itself or in its associated metadata. The unit of the textual data will be simply referred to as a "text". Spatial information can be geographic location information such as home address or positional information indicating a part of physical object such as a car, a human body, and a building. Each type of spatial information can be mapped into a corresponding type of an image.

For example, car complaint data (http://www-odi.nhtsa.dot.gov/downloads/flatfiles.cfm) provided by NHTSA (National Highway Traffic Safety Administration) consists of records of car troubles, and each record consists of textual description of the trouble associated with various information of the car and the trouble such as car manufacturer, car model, date of the trouble, and so on. This car complaint data contains various types of spatial information such as geographic location of the troubles that can be mapped into a geographic image, components associated with the trouble that can be mapped into an image of a vehicle, and human body parts such as "head" and "leg" that can be mapped into an image of a human body.

Also, medical records that consist of textual descriptions of patient condition and treatment are another example of multidimensional data that are associated with various information on the patient such as age, address, and clinical records. These medical records contain various types of spatial information such as location of affected area that can be mapped into an image of a human body, and location of patients' residence or hospitals that can be mapped into geographic image.

Various types of social media data such as Twitter™ data, Facebook™ articles, and other blogs can be multidimensional data with spatial information as they are associated with location of their users and physical objects including products and buildings that can be mapped to some images.

Likewise, any types of enterprise data such as customer contact records collected at call centers and consumer survey data can be multidimensional data. In case of enterprise data, spatial information on physical objects of their products or location of consumer or service area can be mapped into some physical or geographic images.

The storage unit of image data 124 stores one or more sets of image data on spatial information and corresponding mapping information for each subject of analysis in one or more storage media or devices. The type of image data stored by the storage unit of image data 124 may include, but is not limited to, a geographical map, such as an entire US map and maps of US 50 states, an image of physical object, such as a building, a car, a product, a human body and an animal body.

The corresponding mapping information is used for mapping the spatial information into a corresponding image data. In other words, the corresponding mapping information may indicate where the spatial information is located in the image data.

The one or more sets of image data and corresponding mapping information may be prepared by using samples provided for commercially available tools/functions for projecting spatial information into image data, such as IBM™'s RAVE™ (Rapidly Adaptive Visualization Engine) visualization system implemented in IBM Cognos Business Intelligence™ software and the Map Chart™ function of Microsoft's Excel™ spreadsheet program. For images of geographical maps and corresponding mapping information, various samples for each tool are available. Also, such tools may be used as the projecting section 114 detailed later.

On the other hand, in a case where samples are not generally available, arbitrary images can be newly defined by preparing definition files for the tool/function as the projecting section 114 and the property obtaining section 116 detailed later.

Figures 2A, 2B:
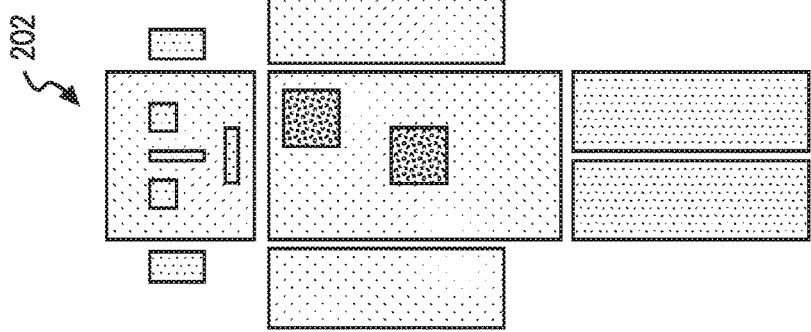
FIGS. 2A and 2B show an image of a human body and a corresponding code respectively according to an embodiment of the present invention.

With reference to FIGS. 2A and 2B, an example of an image of a human body 202 and partial example of a corresponding code 200 for drawing the human body 202 are respectively depicted. FIG. 3 shows a part of the definition file 300 corresponding to the image of the human body 202 as an example of a definition file for IBM's RAVE™ visualization system. In IBM's RAVE™ visualization system, the visualizations themselves are completely defined by the coding language JSON. Therefore, the definition file 300 is prepared as a JSON file. The part of the definition file 300 indicates where the spatial information (such as "head" and "right arm" in the definition file 300) is located in the image of the human body 202. Accordingly, the definition file 300 is mapping information corresponding to the image data of a human body 202.

The storage unit of property data 126 stores one or more property distribution maps for each of predefined properties in one or more storage media or devices. The predefined properties are grouped by a subject of analysis and each predefined property is any property related to the subject of analysis.

The one or more property distribution maps for each predefined property are distribution maps which show portions having the predefined property on different images of the same type. For example, one or more property distribution maps for snowy area may include distribution maps of cities, states, and countries in the world each showing snowy area.

As predefined properties, features such as geographical features and features of physical objects that can lead to some potential value of analysis may be selected.

Geographical features may include, but not are limited to, the following: (a) riverside, mountain range, coast, (b) snowy area, typhoon area, (c) urban area, a big city with a certain population, area based on population, (d) area based on chief industries, (e) area based on average income, area based on education level/criminal area, (f) area based on religion, (g) area based on specific law such as prohibition law and antismoking law and (h) area based on specific disease/infection.

For a human body or animal body, features may include, but are not limited to, the following: (a) area acupressure points, (b) area with hair, (c) area with nail, (d) area related to specific organs, and (e) area related to specific disease.

For artifacts such as cars and buildings, features may include, but are not limited to, the following: (a) weather-beaten area, (b) area with window, and (c) area with specific materials such as glass and metal.

The features described above are illustrative only. Any other features related to the same subject of analysis or other subject of analysis also can be selected as predefined properties.

Each predefined property can be projected to a corresponding image by using the various visualization tools described above, such as IBM's RAVE™ visualization system implemented in IBM Cognos Business Intelligence™ software and Map Chart™ function of Microsoft's Excel™ spreadsheet program based on statistical information on the predefined property.

Recently government institutions and organizations or other public bodies are releasing statistical information on various areas of citizens' lives, such as economic and social development, living condition, health, education and the environment, free of charge. Also, some private companies provide various types of statistical data for a fee or for free. Such statistical information may indicate which portion on the corresponding image is related to the subject matter of the statistical information and how much the portion is related to the subject matter of the statistical information.

Therefore, in many cases, one or more property distribution maps for each predefined property may be prepared by projecting the predefined property into images referring to the statistical information on the predefined property. In preferable embodiment, images stored in the storage unit of image data 124 are used for projecting each predefine property.

For example, in terms of population of United States, basic statistical information consists with lists of State names associated with number of residents in each corresponding state such as the following:
State A: 25,146,105
State B: 18,804,623
State C: 19,378,087
State D: 12,831,549

This population information is mapped into the maps of the United States in such a way that States of higher populations are colored with darker color or States with populations higher than the certain threshold such as 8 million people are colored by using the various visualization tools described above.

In addition, many of the predefined properties are already available in images which show distributions of the predefined properties through publicly available services such as services by World By Map (see http://world.bymap.org/) and StatWorld—Interactive Maps of Open Data services by StatSilk (see https://www.statsilk.com/maps/world-stats-open-data). The storage unit of property data 126 may store such images as property distribution maps for predefined properties.

The extracting section 104 extracts, for each text, spatial information from the text and its associated metadata stored in the storage unit of source data 122. For spatial information as a geographic location, the extracting section 104 may identify it by using natural language processing techniques such as any Named-entity recognition techniques. For other types of spatial information such as positional information indicating a part of a physical object including a human body and animal body, the extracting section 104 may identify it by referring to dictionaries designed for describing parts of the object (such as "arm" and "leg" for human body) in accordance with general terms that describe positions such as "top of" and "bottom of". The extracting section 104 stores identified spatial information in association with the text as a correspondence table 106.

When two or more different types of spatial information are identified for the text, the extracting section 104 may store all spatial information in association with the text. On the other hand, when the same types of spatial information are identified for the text, the extracting section 104 may select spatial information from metadata associated to the text preferentially.

The inputting section 120 receives one or more instructions from an operator of the system 100. When the list creator 108, described later, creates one or more feature lists 110, the instructions may include one or more descriptions or IDs of domains of a textual feature to be listed and/or analytic purpose. Also, when the operator starts to analyze, the instructions may include a plurality of descriptions or IDs which can specify (1) target multidimensional data to be analyzed, (2) a target feature list or one or more target textual features directly, (3) one or more target types of spatial information and one or more target images, and (4) one or more target property distribution maps.

The list creator 108 creates one or more feature lists 110 by collecting any linguistic expressions such as nouns from multidimensional data, from especially tagged keywords, stored in the storage unit of source data 122 as long as each of the expressions can specify a subset of texts in the multidimensional data. Here, "each of the expressions can specify a subset of texts in the multidimensional data" means that there is a subset of texts which contain the expression in itself or in its associated metadata.

Instead, in order to improve efficiency performance, the list creator 108 may use, as textual features to be listed, predefined expressions or items such as troubles in the car complaint domain according to one or more instructions through the inputting section 120. For example, the troubles in the car complaint domain consists of expressions of specific troubles in automotive domain including "leak", "noise", and "rust".

In case of analyzing human body, in order to associate disease and treatment with some phenomena, the list creator 108 may use expressions of disease such as "headache", "heart failure", and "cancer" or treatment such as "medication", "vaccination", and "dietary restriction" as textual features to be listed according to one or more instructions through the inputting section 120.

In addition, the list creator 108 may use the existing ontologies such as WordNet (https://wordnet.princeton.edu/) and MeSH (https://www.nlm.nih.gov/mesh/) to create the feature lists 110 depending on the domain and analytic purposes which are specified by instructions through the inputting section 120.

In the above cases, the list creator 108 may store the created feature lists in association with the description or ID of domain, such as "troubles in the car complaint domain" and "disease and treatment for a human" in one or more storage media or devices.

The selecting section 112 selects a target feature list from among one or more feature lists 110 according to one or more instructions through the inputting section 120 and reads one textual feature listed in the target feature list. Then, the selecting section 112 selects a subset of texts specified by the read textual feature from the target multidimensional data stored in the storage unit of source data 122. As described above, each text of the subset selected by the selecting section 112 contains the read textual feature in itself or in its associated metadata. The selecting section 112 outputs the selected subset of texts and the one or more instructions to the projecting section 114. The selecting section may repeat these process until there is no textual feature to be read in the target feature list.

The projecting section 114 receives the subset of texts selected by the selecting section 112 and reads, for each text of the subset, spatial information associated to the text of the subset from the correspondence table 106. In the embodiment, the projecting section 114 may read, for each text of the subset, all types of spatial information associated to the text of the subset in the corresponding table 106. In another embodiment, the projecting section 114 may read, for each text of the subset, one or more target types of spatial information associated to the text of the subset in the corresponding table 106 according to the one or more instructions through the selecting section 112.

The projecting section 114 also reads one or more target images and corresponding mapping information from the storage unit of image data 124 according to the one or more instructions through the selecting section 112.

Then, the projecting section 114 projects each text of the subset into each target image based on the corresponding spatial information by referring to the corresponding mapping information to obtain a spatial distribution map for the subset of texts, that is, the textual feature which each text of the subset contains in common.

In one embodiment, the projecting section 114 may group the texts of the subset by corresponding spatial information and count elements of each group to have list of spatial information (consisting of spatial information associated with number of the elements such as "Tokyo 50, Osaka 35, Yokohama 20"). Then the projecting section 114 may project spatial information in the list of spatial information into the target image according to the corresponding number of elements by referring to the corresponding mapping information to obtain a spatial distribution map for the textual feature.

As described above, commercially available tools/functions for projecting spatial information to image data, such as IBM's RAVE™ visualization system implemented in IBM Cognos Business Intelligence™ software and Map Chart™ function of Microsoft's Excel™ spreadsheet program, can be used as the projecting section 114 in order to obtain a spatial distribution map for the textual feature.

The projecting section 114 outputs the spatial distribution map for the textual feature to the determining section 118. Also, the projecting section 114 may output the one or more instructions to the property obtaining section 116.

The property obtaining section 116 reads one or more target property distribution maps from the storage unit of property data 126 according to the one or more instructions through the projecting section 114.

In a case where there are two or more property distribution maps for the same predefined property, and the one or more instructions instruct only a target set of predefined properties, the property obtaining section 116 may select a property distribution map on an image which shows the same graphical area or the same physical object that the target image read by the projecting section 114 shows.

The property obtaining section 116 outputs the selected one or more property distribution maps to the similarity determining section 118.

The similarity determining section 118 receives the spatial distribution map for the textual feature obtained by the projecting section 114 and the property distribution maps obtained by the property obtaining section 116. The similarity determining section 118 may determine the similarity between the spatial distribution map for the textual feature and each property distribution map for each predefined property.

When the spatial distribution map for the textual feature and each property distribution map for each predefined property share a source image before projection, the similarity determining section 118 may determine the similarity between these two maps simply by comparing them.

In other cases, for determining the similarity between the two distribution maps, any techniques for image retrieval, image recognition, or image classification including ones with neural networks can be used.

For example, image meta search or content-based image retrieval (CBIR) techniques may be employed to determine the similarity of a plurality of images by comparing features extracted from the images. Features may be extracted from each of the selected plurality of images using known feature extraction techniques, such as, e.g., speeded up robust features (SURF), scale-invariant feature transform (SIFT), oriented BRIEF (ORB), etc. Other feature extraction techniques may also be employed. Preferably, multiple feature extraction techniques are employed to extract features from the plurality of images.

Similarities are calculated for the target images. Outliers that are not similar to the other images are removed using outlier detection techniques. Outlier detection techniques may include, e.g., local outlier factor (LOF), student's t-test, etc. Other techniques may also be employed. A method for extracting features and calculating similarity is selected that is best fitted and results in the highest similarities among the remaining target images. Using the selected feature extraction and similarity method, pair-wise similarities $s(l,j,k)$ are calculated between each image from the remaining target images and each candidate image.

The similarities preferably include, e.g., cosine similarity, Jaccard similarity, etc. Calculating similarity may include extracting visual words by clustering all the keypoints from feature extraction of the candidate images, attach cluster IDs (i.e., visual words) for each keypoint in target expression images and candidate expression images, calculating a histogram of visual words for each image as a feature vector, and calculating cosine similarity of feature vectors for each pair of images.

In some embodiments, a distance measure may be better than the similarity measure. The distance measure may include, e.g., a Euclidean distance, Manhattan distance, etc. Other distance metrics may also be employed. The distance of each image is sorted in, e.g., ascending order, where each distance is calculated from the histogram of feature extraction.

The similarity determining section 118 outputs determined similarities between the spatial distribution map for the textual feature and each property distribution map for each predefined property to the outputting section 121.

The outputting section 121 receives the similarities between the spatial distribution map for the textual feature and each property distribution map for each predefined property. The outputting section 121 may compare each similarity between two maps to a threshold and in response to the similarity exceeding the threshold, may output the textual feature as a notable textual feature together with the predefined property. At this time, the outputting section 121 may also output the similarity as an index of relationship strength.

The threshold may be adjusted either by specifying the value manually or by providing a set of positive and negative images to be judged for output.

Like this, a textual feature that causes a specific distribution in spatial information is identified by comparison to various types of property distribution maps. Thereby, new insights which are not identified by conventional methods such as finding words for which corresponding spatial information is concentrated in a single area on the map can be derived.

Referring to FIG. 4A, a preprocessing before analysis according to an exemplary embodiment of the present invention is shown. Note that the preprocessing shown in FIG. 4A may be executed by a processing unit that implements the analyzer 102, especially the list creator section 108 and the inputting section 120, shown in FIG. 1.

The preprocessing shown in FIG. 4A may begin at step S400 in response to receiving an instruction for initiating a preprocessing before analysis from an operator. The operator may designate a creation of one or more feature lists 102 for one or more subjects of analysis.

At step S400, the processing unit may collect any linguistic expressions such as nouns as textual features to be listed from multidimensional data, especially from tagged keywords, stored in the storage unit of source data 122 for each subject of analysis as long as each of the expressions appears in more than predetermined number of texts within the multidimensional data.

Instead, as described above, the processing unit may use predefined expressions or items as textual features to be listed according to the instructions. The instructions may include one or more descriptions or IDs of domain of a textual feature to be listed and/or analytic purposes. The predetermined expressions or items belong to at least one of one or more instructed domains and can be available through the existing ontologies.

At step S402, the processing unit may store the created feature lists 102 in association with the description or ID of the one or more instructed domains respectively and then, the preprocessing may end.

Referring to FIG. 4B, a preprocessing before analysis according to an exemplary embodiment of the present invention is shown. Note that the preprocessing shown in FIG. 4B may be executed by a processing unit that implements the analyzer 102, especially the extracting section 104, shown in FIG. 1.

The preprocessing shown in FIG. 4B may begin at step S404 in response to receiving an instruction for initiating a preprocessing before analysis from an operator. The operator may designate a creation of correspondence table 106 for multidimensional data stored in the storage unit of source data 122.

At step S404, the processing unit may extract, for each text within the multidimensional data, spatial information from the text and its associated metadata. As described above, for spatial information as a geographic location, the processing unit may identify it by using any Named-entity recognition techniques. For other types of spatial information such as position in a physical object, the processing unit may identify it by referring to dictionaries designed for describing parts of the physical object in accordance with general terms that describe positions such as "top of" and "bottom of".

At step S406, the processing unit may store, for each text, the read spatial information in association with the text or the ID of the text to have the correspondence table 106 and then, the preprocessing may end. When two or more different types of spatial information are identified for the text, and there are no instructions from the operator, the processing unit may store all spatial information in association with the text. On the other hand, when the same types of spatial information are identified for the text, the processing unit may store only spatial information from metadata in association with the text.

Figures 5A, 5B:
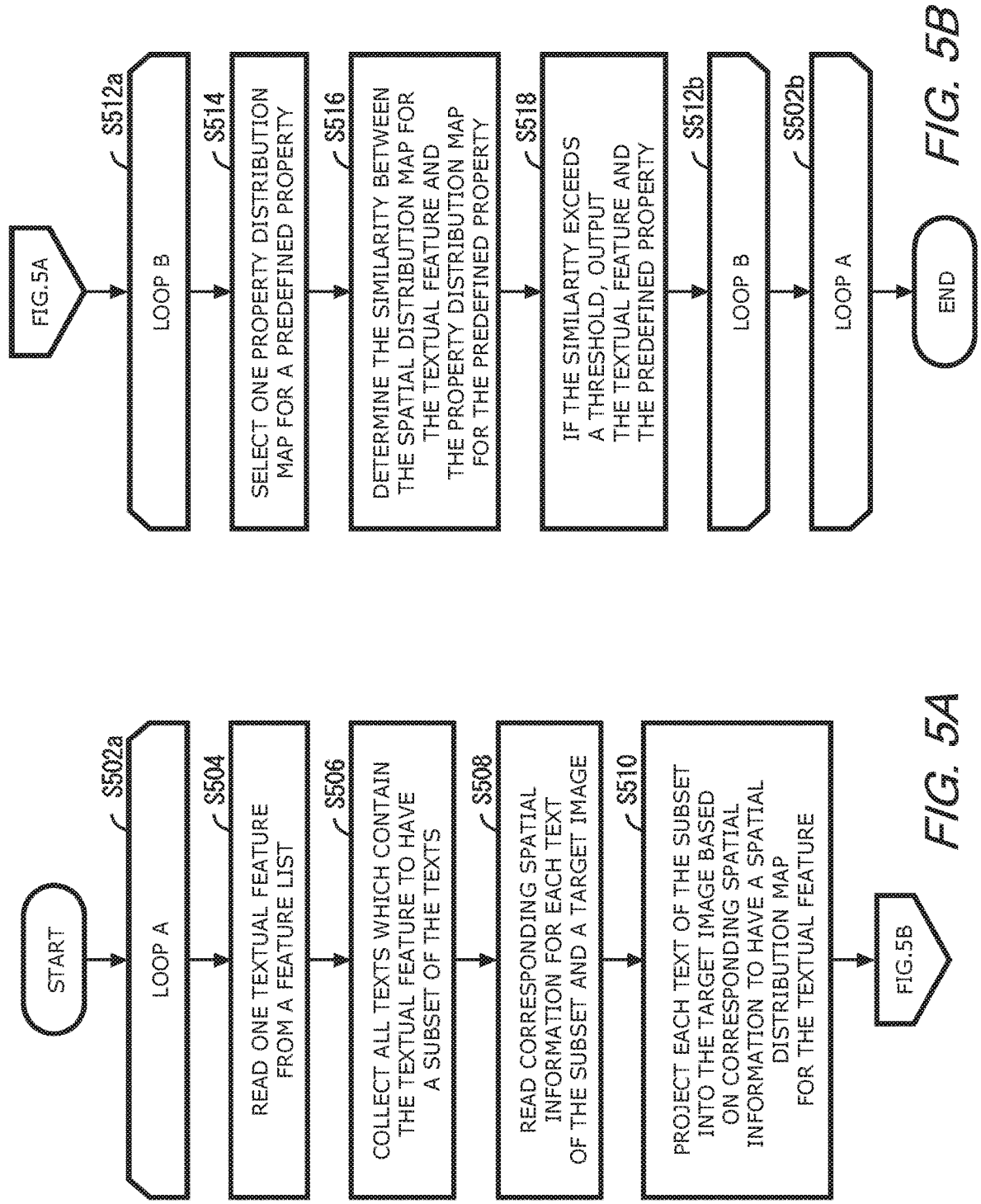
FIGS. 5A and 5B are flowcharts each depicting parts of a process for use in analyzing multidimensional data, according to an embodiment of the present invention.

Referring to FIGS. 5A and 5B, a process for use in analyzing multidimensional data according to an exemplary embodiment of the present invention is shown. Note that the process shown in FIGS. 5A and 5B may be executed by a processing unit that implements the analyzer 102, especially the selecting section 112, the projecting section 114, the property obtaining section 116, the similarity determining section 118, the outputting section 121, and the inputting section 120, shown in FIG. 1.

The process shown in FIG. 5A may begin in response to receiving an instruction for initiating a process for analyzing multidimensional data from an operator (analyst). The operator may designate target multidimensional data to be analyzed. As an option, the operator may designate a target feature list (a target textual feature), target type of spatial information/target image data and a target set of predefined properties.

At step S502a, a loop A starts. Next, at step S504, the processing unit may read one textual feature from the target feature list designated by the operator. The loop A repeats a series of steps between S502a in FIG. 5A and S502b in FIG. 5B until all textual features listed in the target feature list are read.

At step S506, the processing unit may collect all texts which contain the textual feature to have a subset of the texts. In one embodiment, texts to be collected may include texts containing similar expressions or variations of the textual feature. Such similar expressions or variations of the textual feature can be identified by using a thesaurus.

At step S508, the processing unit may read, for each text of the subset, corresponding target types of spatial information designated by the operator from the corresponding table 106. Also, the processing unit may read target image designated by the operator and corresponding mapping information from the storage unit of image data 124.

At step S510, the processing unit may project each text of the subset into the target image based on the corresponding spatial information referring to the mapping information to have a spatial distribution map for the textual feature. Then, the process proceeds to the next step S512a in FIG. 5B.

Referring to FIG. 5B, at step 512a, another loop B starts. Next, at step S514, the processing unit may select one predefined property from among a target set of predefined properties designated by the operator and may read a property distribution map corresponding to the selected predefined property from the storage unit of property data 126. The loop B repeats a series of steps between S512a and S512b until all property distribution maps corresponding to the target set of predefined properties are read.

At step S516, the processing unit may determine the similarity between the spatial distribution map for the textual feature and the property distribution map for the selected predefined property. In one embodiment, the processing unit may determine the similarity by using techniques for image recognition or image classification.

At step S518, the processing unit may compare each similarity between the two maps to a threshold and in response to the similarity exceeding the threshold, may output the textual feature as a notable textual feature together with the predefined property. At this time, the outputting section 121 may also output the similarity as an index of relationship strength.

At step S512b, if the end condition of the loop B is met, then the process may proceed to the next step S502b. Otherwise, the process may return to step S512a.

At step S502b, if the end condition of the loop A is met, then the process may end. Otherwise, the process may return to step S502a in FIG. 5A.

With reference to FIGS. 6A, 6B, 6C, 6D and 6E experimental results of projection of negative items to an entire US map are depicted. The multidimensional data to be analyzed can be car complaint data provided by NHTSA described above. The purpose of experiment is to check if novel pieces of information can be found by analyzing the deviation of regional distribution based on spatial (location) information linked to each text within the complaint data.

Figure 6A:
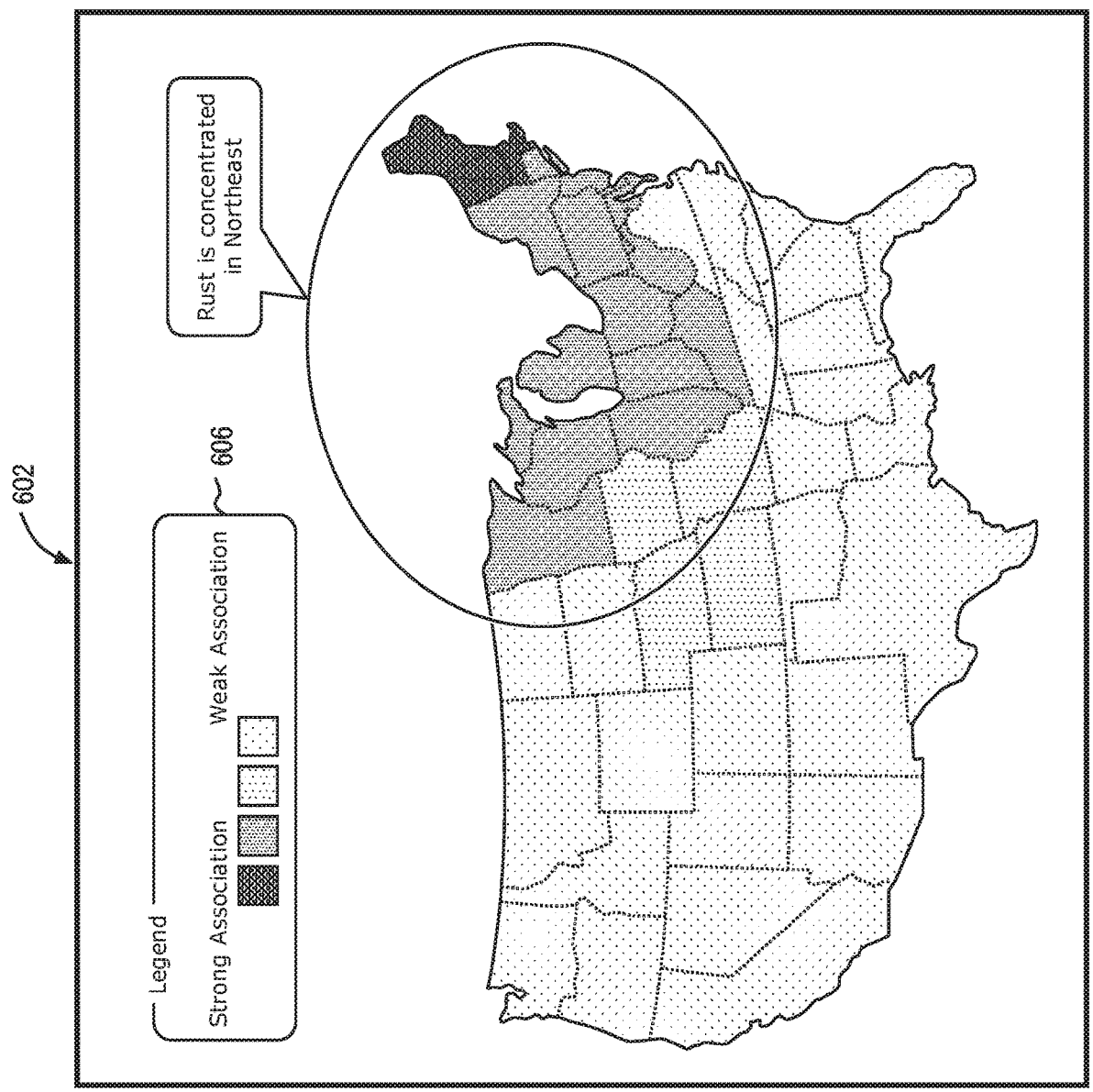
FIGS. 6A, 6C, and 6E show experimental results of projection to US map, according to an embodiment of the present invention
Figure 6B:
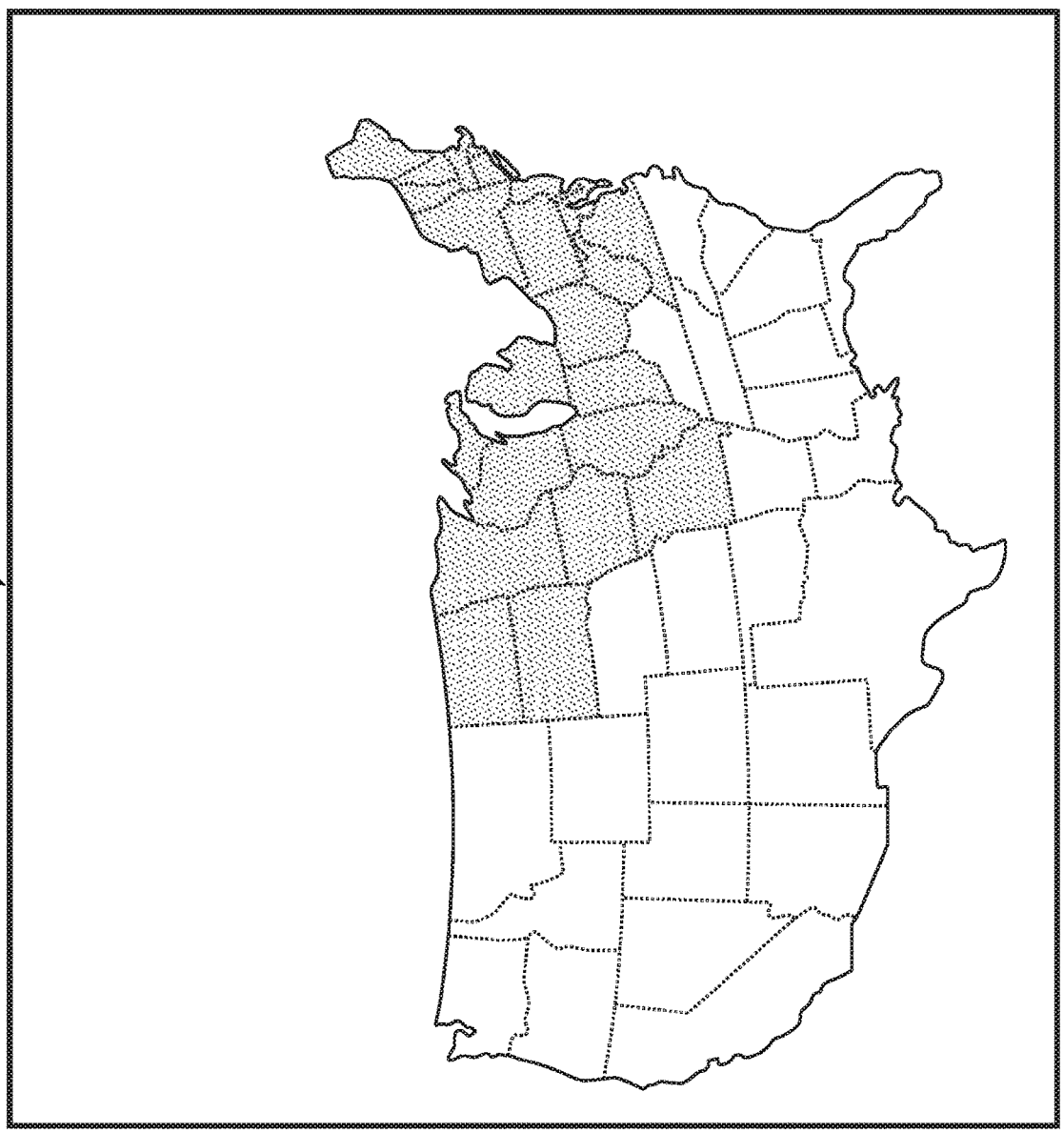
Figure 6C:
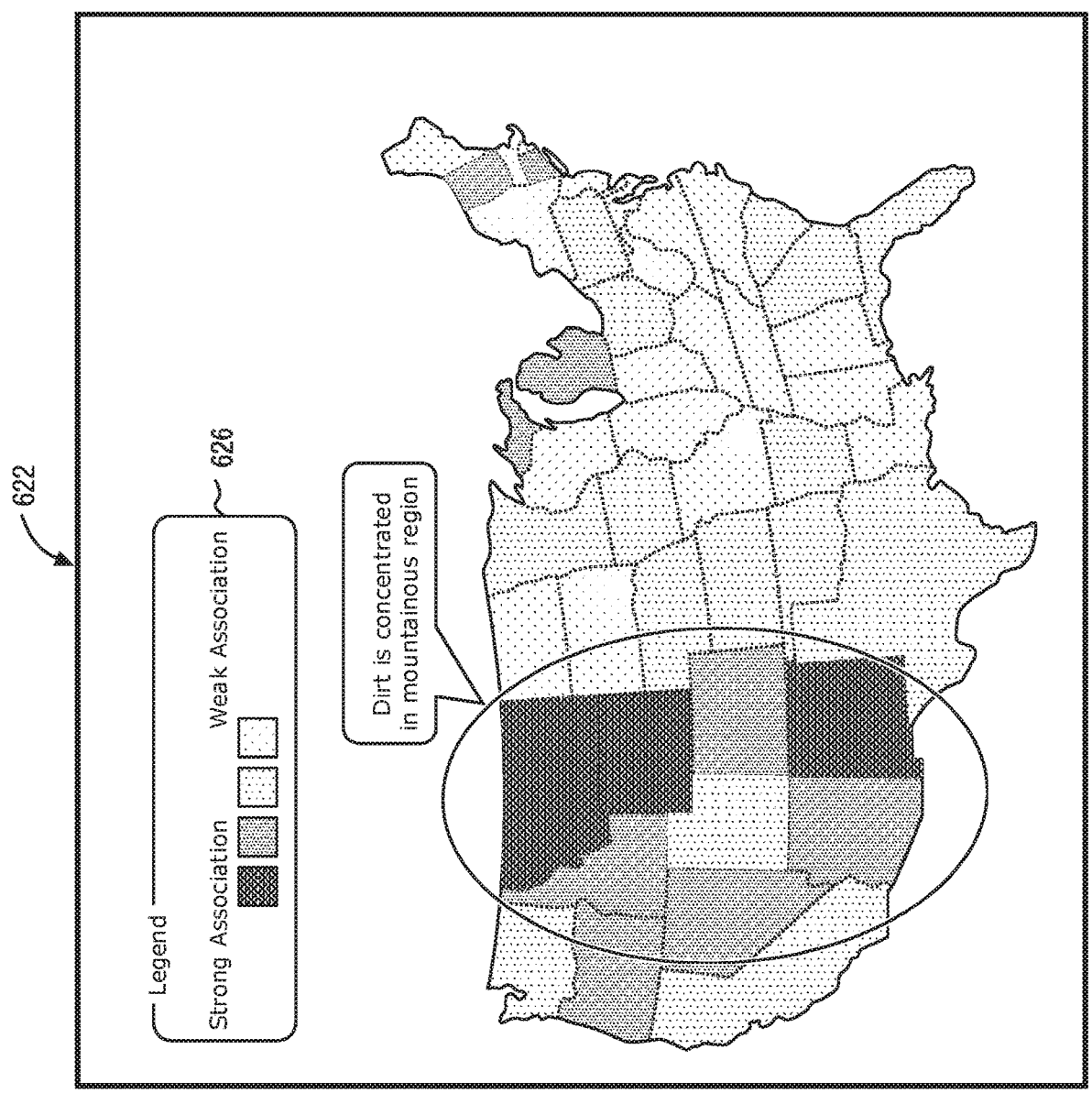
Figure 6E:
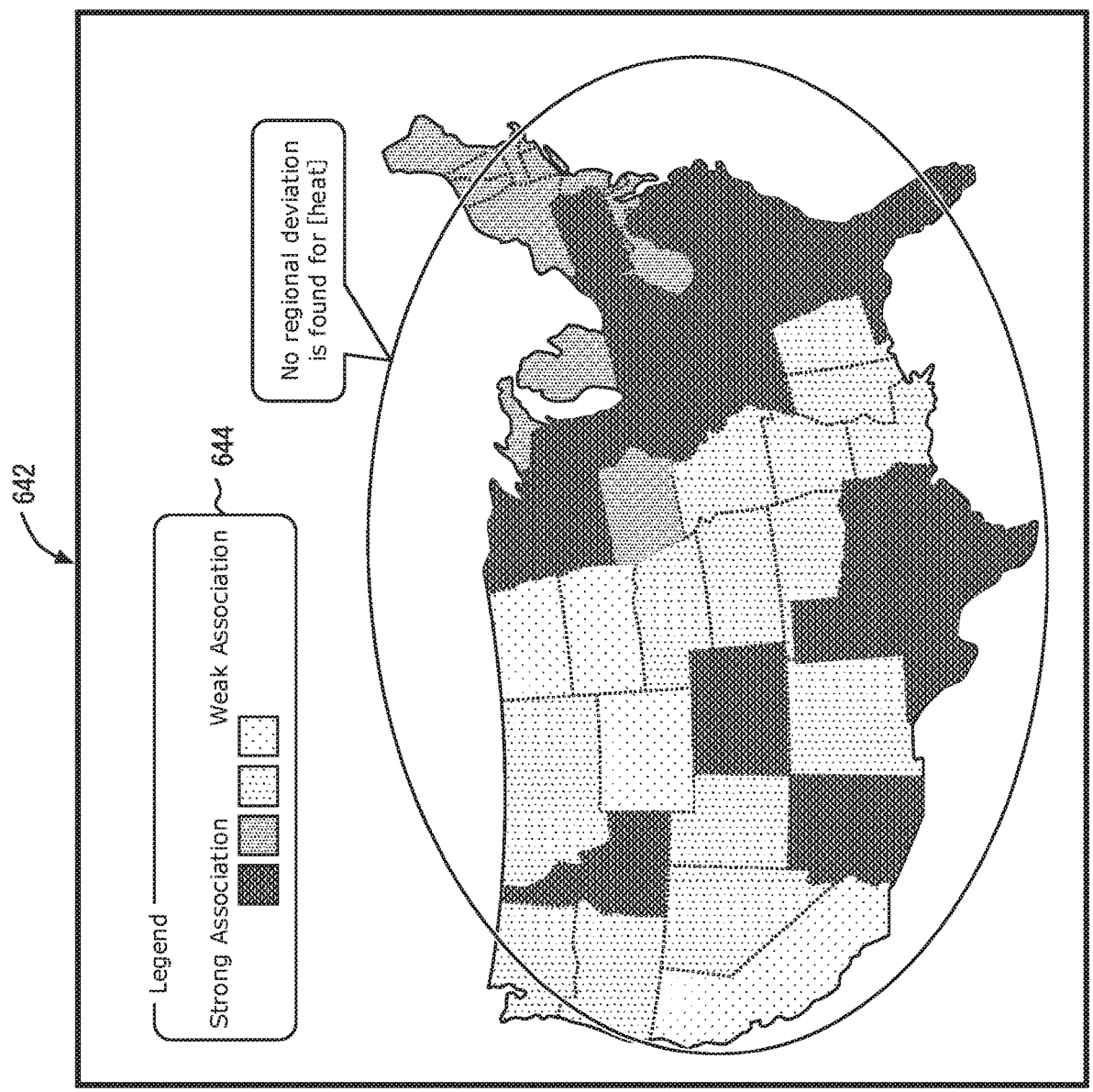

In the experiment, 19 negative textual features such as "noise" and "rust" in defect and state domains are extracted from each text within the complaint data. And for each negative textual feature, a subset of texts containing the negative textual feature is collected and the subset of texts is mapped into the entire US map based on location information linked to each texts of the subset. Then, spatial distribution maps for each of 19 negative textual features is compared with geographical property distributions. FIGS. 6A, 6B, and 6C show the comparison results partially.

FIG. 6A shows the spatial distribution map for "rust" and FIG. 6B shows the distribution map of Salt Belt area, in which large quantities of salt are applied to roads during the winter season to control snow and ice. As FIGS. 6A and 6B show, these two maps match. From this result, we can obtain new insight that "rust" problem tends to happen in Salt Belt area, indicating that protection against rust is essential in the Salt Belt area and rust-proofing should be tested in the Salt Belt area for the vehicles sold in United States.

FIG. 6C shows the spatial distribution map for "dirt" and FIG. 6D shows the distribution of mountainous regions (known as the Mountain States, the Mountain West and the Interior West). As FIGS. 6C and 6D show, these two maps match. From this result, we can obtain new insight that "dirt" related car troubles are typically reported in the Mountain States, indicating the protection against dirt is required in the mountainous regions.

On the other hand, as FIG. 6C shows, the spatial distribution map for "heat" does not match any geographical property distributions.

Like this, a textual feature that causes a specific distribution in spatial information is identified by comparison to various types of property distribution maps.

For example, as in FIG. 7, mentions 702 to human body parts can be mapped into a human image 704 such as "pain in stomach" mapped to stomach position in the image. By mapping to the image, distribution in contiguous areas such as "back", "breech", and "coccyx" are properly handled automatically. On the other hand, distribution of non-contiguous regions such as edge of human body indicated by "hand" and "foot" can be matched to property data of images related to symptoms possibly caused by the distance from heart.

Figure 8:
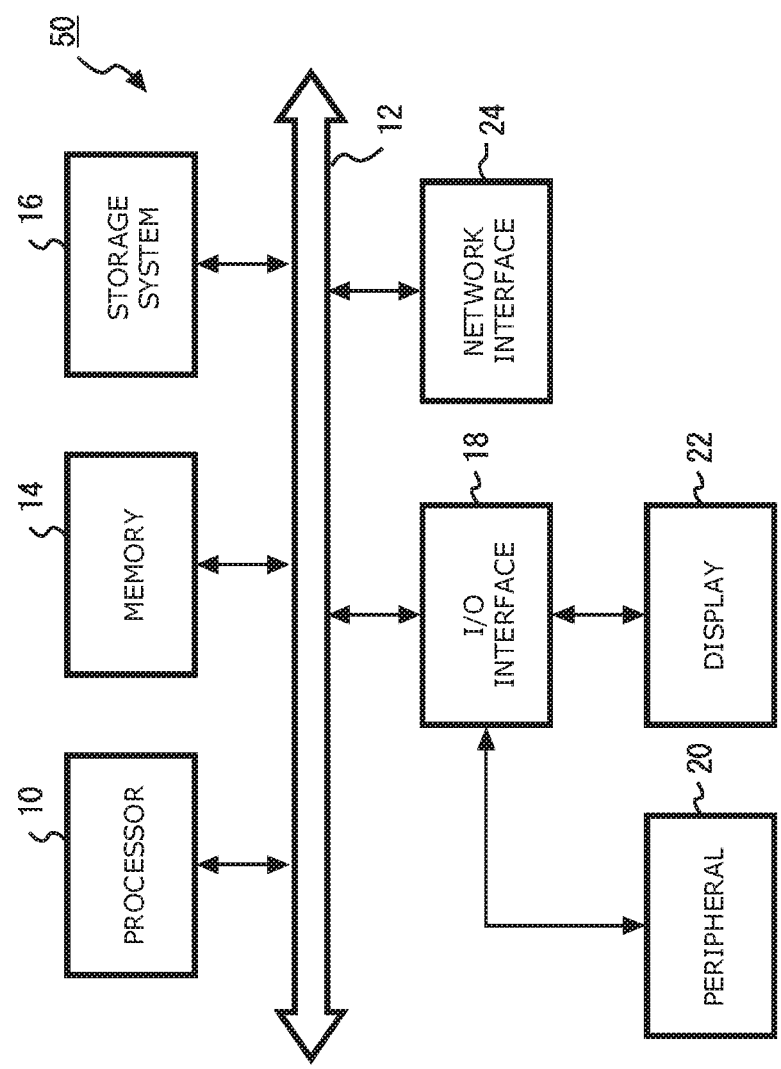
FIG. 8 depicts a computer system according to one or more embodiment of the present invention.

Referring now to FIG. 8, a schematic of an example of a computer system 50, which can be used for the system 100 and an analyzer 102, is shown. The computer system 50 shown in FIG. 8 is implemented as a computer system. The computer system 50 is only one example of a suitable processing device and is not intended to suggest any limitation as to the scope of use or functionality of embodiments of the invention described herein. Regardless, the computer system 50 is capable of being implemented and/or performing any of the functionality set forth hereinabove.

The computer system 50 is operational with numerous other general purpose or special purpose computing system environments or configurations. Examples of well-known computing systems, environments, and/or configurations that may be suitable for use with the computer system 50 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 50 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computer system 50 is shown in the form of a general-purpose computing device. The components of the computer system 50 may include, but are not limited to, a processor (or processing unit) 10 and a memory 14 coupled to the processor 10 by a bus 12 including a memory bus or memory controller, and a processor or local bus using any of a variety of bus architectures.

The computer system 50 typically includes a variety of computer system readable media. Such media may be any available media that is accessible by the computer system 50, and it includes both volatile and non-volatile media, removable and non-removable media.

The memory 14 can include computer system readable media in the form of volatile memory, such as random access memory (RAM). The computer system 50 may further include other removable/non-removable, volatile/non-volatile computer system storage media. By way of example only, the storage system 16 can be provided for reading from and writing to a non-removable, non-volatile magnetic media. As will be further depicted and described below, the storage system 16 may include at least one program product having a set (e.g., at least one) of program modules that are configured to carry out the functions of embodiments of the invention.

Program/utility, having a set (at least one) of program modules, may be stored in the storage system 16 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 50 may also communicate with one or more peripherals 20, such as a keyboard, a pointing device, an audio system, etc.; a display 22; one or more devices that enable a user to interact with the computer system 50; and/or any devices (e.g., network card, modem, etc.) that enable the computer system 50 to communicate with one or more other computing devices. Such communication can occur via Input/Output (I/O) interfaces 18. Still yet, the computer system 50 can communicate with one or more networks such as a local area network (LAN), a general wide area network (WAN), and/or a public network (e.g., the Internet) via the network adapter 24. As depicted, the network adapter 24 communicates with the other components of the computer system 50 via a bus. It should be understood that although not shown, other hardware and/or software components could be used in conjunction with the computer system 50. Examples, include, but are not limited to: microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for use in analyzing multidimensional data, comprising,
   selecting a subset of texts from a collection of textual data included in the multidimensional data, the subset being specified by a textual feature from the multidimensional data;
   extracting, for each text, corresponding spatial information from the multidimensional data;
   projecting each text of the subset into a target image based on the corresponding spatial information to obtain a spatial distribution map of the textual feature;
   obtaining, for a predefined property, a property distribution map which shows portions having the predefined property on a target image;
   determining a similarity between the spatial distribution map for the textual feature and the property distribution map for the predefined property; and
   outputting, in response to the similarity exceeding a threshold, the textual feature as a notable textual feature together with the predefined property.

2. The method according to claim 1, wherein the textual feature includes a noun extracted from the multidimensional data.

3. The method according to claim 1, wherein the textual feature includes a keyword extracted from metadata related to texts within the multidimensional data.

4. The method according to claim 1, wherein the corresponding spatial information includes geographic location information.

5. The method according to claim 4, wherein the corresponding spatial information is extracted from at least one of the text and metadata associated to the text by using natural language processing technique.

6. The method according to claim 1, wherein the corresponding spatial information is positional information indicating a part of a physical object.

7. The method according to claim 6, wherein the corresponding spatial information is extracted from at least one of the text and metadata associated to the text by referring to a dictionary designed for describing parts of the physical object in accordance with general terms that describe positions.

8. The method according to claim 1, wherein the multidimensional data includes a plurality of attributes relating to each respective text.

9. The method according to claim 8, wherein the target image is an image of a geographical map and the predefined property includes geographical features.

10. The method according to claim 8, wherein the target image is an image of a physical object and the predefined property includes properties of the physical object.

11. The method according to claim 1, wherein the similarity is determined by a technique for image recognition or image classification.

12. A computer system for use in analyzing multidimensional data, by executing program instructions, the computer system comprising:
    a memory tangibly storing the program instructions;
    a processor in communication with the memory for executing the program instructions, wherein the processor is configured to:
    select a subset of texts from a collection of textual data included in the multidimensional data, the subset being specified by a textual feature from the multidimensional data;
    extract, for each text, corresponding spatial information from the multidimensional data;
    project each text of the subset into a target image based on the corresponding spatial information to obtain a spatial distribution map of the textual feature;
    obtain, for a predefined property, a property distribution map which shows portions having the predefined property on a target image;
    determine the similarity between the spatial distribution map for the textual feature and the property distribution map for the predefined property; and
    output, in response to the similarity exceeding a threshold, the textual feature as a notable textual feature together with the predefined property.

13. The computer system according to claim 12, wherein the corresponding spatial information includes a geographic location extracted from at least one of the text and metadata associated to the text by using natural language processing technique.

14. The computer system according to claim 12, wherein the corresponding spatial information includes positional information indicating a part of a physical object and is extracted from at least one of the text and metadata associated to the text by referring to a dictionary designed for describing parts of the physical object in accordance with general terms that describe positions.

15. The computer system according to claim 12, wherein the target image is an image of a geographical map and the predefined property includes geographical features.

16. The computer system according to claim 12, wherein the target image is an image of a physical object and the predefined property includes properties of the physical object.

17. A computer program product for use in analyzing multidimensional data, the computer program product comprising a computer readable storage medium having program instructions embodied therewith, the program instructions executable by a computer to cause the computer to perform a method comprising:
    selecting a subset of texts from a collection of textual data included in the multidimensional data, the subset being specified by a textual feature from the multidimensional data;
    extracting, for each text, corresponding spatial information from the multidimensional data;

projecting each text of the subset into a target image based on the corresponding spatial information to obtain a spatial distribution map of the textual feature;

obtaining, for a predefined property, a property distribution map which shows portions having the predefined property on a target image;

determining a similarity between the spatial distribution map for the textual feature and the property distribution map for the predefined property; and outputting, in response to the similarity exceeding a threshold, the textual feature as a notable textual feature together with the predefined property.

18. The computer program product according to claim 17, wherein the corresponding spatial information includes positional information indicating a part of a physical object and is extracted from at least one of the text and metadata associated to the text by referring to a dictionary designed for describing parts of the physical object in accordance with general terms that describe positions.

19. The computer program product according to claim 17, wherein the target image includes an image of a geographical map and the predefined property includes geographical features.

20. The computer program product according to claim 17, wherein the target image includes an image of a physical object and the predefined property includes properties of the physical object.

* * * * *